(12) United States Patent
Morrison et al.

(10) Patent No.: US 11,378,335 B2
(45) Date of Patent: Jul. 5, 2022

(54) VACUUM COOLED GRAIN DRYER

(71) Applicant: The GSI Group LLC, Assumption, IL (US)

(72) Inventors: David Morrison, Carlinville, IL (US); Randy Sheley, Assumption, IL (US)

(73) Assignee: GSI GROUP LLC, Assumption, IL (US)

( * ) Notice: Subject to any disclaimer, the term of this patent is extended or adjusted under 35 U.S.C. 154(b) by 32 days.

(21) Appl. No.: 17/020,284

(22) Filed: Sep. 14, 2020

(65) Prior Publication Data

US 2021/0088282 A1  Mar. 25, 2021

Related U.S. Application Data

(60) Provisional application No. 62/899,483, filed on Sep. 12, 2019.

(51) Int. Cl.
*F26B 17/12* (2006.01)
*F26B 21/10* (2006.01)

(52) U.S. Cl.
CPC ............ *F26B 21/10* (2013.01); *F26B 17/126* (2013.01); *F26B 17/128* (2013.01); *F26B 2200/06* (2013.01)

(58) Field of Classification Search
CPC ...... F26B 21/10; F26B 17/126; F26B 17/128; F26B 2200/06; F26B 3/06; F26B 23/007; Y02P 70/10
USPC .................................................. 34/380, 608
See application file for complete search history.

(56) References Cited

U.S. PATENT DOCUMENTS

| | | | | |
|---|---|---|---|---|
| 4,337,584 A | * | 7/1982 | Johnson ................ | F26B 21/086 34/174 |
| 2012/0011736 A1 | * | 1/2012 | Morrison .............. | F26B 17/124 34/165 |
| 2017/0299263 A1 | * | 10/2017 | Heilskov ............... | F26B 17/128 |
| 2019/0170437 A1 | | 6/2019 | Heilskov et al. | |
| 2020/0138051 A1 | * | 5/2020 | Pacheco Da Cunha ..................... | A23B 9/025 |

OTHER PUBLICATIONS

UK Intellectual Property Office, Search Repod for related UK Application No. GB1914029.2, dated Jan. 10, 2020.

* cited by examiner

*Primary Examiner* — John P McCormack

(57) ABSTRACT

A grain dryer has a heated drying section with an upper plenum and a cooling section. A heater is positioned between the lower plenum and the upper plenum, wherein air is heated by the heater as air in the lower plenum is pulled through the heater and into the upper plenum. A fan takes a suction from a ductwork on the heated drying section to draw a vacuum in the upper and lower plenums. Grain enters the dryer and flows into the drying section where the grain is exposed to heated air being pulled from the upper plenum into the ductwork. Grain flows from the drying section into the cooling section where the grain is exposed to cooling air being pulled through outer walls of the cooling section into the lower plenum. Grain flows from the cooling section into the unloading section.

6 Claims, 3 Drawing Sheets

VACUUM COOLED GRAIN DRYER

CROSS REFERENCE TO RELATED APPLICATIONS

This application claims the benefit of U.S. Provisional Application No. 62/899,483, filed Sep. 12, 2019, which is hereby incorporated by reference in its entirety.

BACKGROUND OF THE INVENTION

Field of Invention

This invention relates generally to agricultural dryers, and more particularly to mixed-flow grain dryer having a vacuum cool heat recovery system.

Description of Related Art

Grains such as wheat, corn, soybean, and other agricultural products such as nuts, often need to be dried after harvesting to achieve a moisture content adequate for inhibiting microbial growth during storage and preserve the value of the stored product. Agricultural dryers most commonly referred to as grain dryers, allow farmers to start harvesting earlier at higher moisture levels and dry the products in bins to a more optimal moisture content, increasing yields and improving profits. This allows the farmer to minimize weather risks, reduce dry matter loses, and reduce head shatter loss. Drying typically involves the reduction of moisture from about 17-30% w/w to values between 8 and 15% w/w, depending on the product involved.

Drying the product includes directing an air flow through a heater to heat the air and then directing the heated airflow through the product storage bin. Various methods of drying grain are well-known in the art. Cross-flow dryers provide airflow in a direction perpendicular to the flow of the grain. They utilize perforated screens to hold the grain in columns while allowing air to pass through the grain. However, the exhaust-side screens can become plugged resulting in the necessity for frequent cleanings. Cross-flow dryers can also result in an uneven temperature distribution of grain across the column. It is also known to use heat from the grain as it is cooled to preheat the air to be directed through the columns. Mixed-flow dryers utilize lower airflow, slower grain heating rates and give more consistent air temperature and humidity to all the grain going through the dryer. But because of the large airflow ducts in mixed-flow dryers, they must utilize pressure-cooling to keep particulate in the grain from entering the fan, heater, and drying plenum and causing a fire hazard. With this design, air heated by the grain cooling process is exhausted to the atmosphere, reducing the efficiency of the process.

Therefore, a need exists in the art for an improved dryer that increases fuel efficiency while maintaining optimal grain quality.

OVERVIEW OF THE INVENTION

In one aspect, the invention is directed to a grain dryer for heating and drying grain. The dryer includes a receiving area having an inlet port to receive grain entering the dryer and a heated drying section. The heated drying section includes a pair of heating columns with an upper plenum in communication with the pair of heating columns, each heating column having an inner wall and an outer wall configured to contain and direct the grain in a downward direction around a plurality of baffles that provide air paths from the inner wall to the outer wall. The grain dryer includes a cooling section beneath and in communication with heated drying section, the cooling section having a pair of cooling columns with a lower plenum in communication with the pair of cooling columns, each cooling column having a screened outer wall and a screened inner wall. The grain dryer having a heater positioned between the lower plenum and the upper plenum, wherein air is heated by the heater as air in the lower plenum is pulled through the heater and into the upper plenum. The grain dryer includes a ductwork connected to the outer wall of each heating column. At least one fan takes a suction from the ductwork to draw a vacuum in the upper plenum and the lower plenums compared to ambient pressure. The grain dryer includes an unloading section having a grain conveying mechanism. Grain enters the dryer through inlet port and flows from the receiving area into the heating columns where the grain is exposed to heated air being pulled from the upper plenum into the ductwork. Grain flows from the heating columns into cooling columns where the grain is exposed to cooling air being pulled through the outer walls of the cooling columns into the lower plenum. Grain flows from the cooling section into the unloading section.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, configurations and equivalents as will become apparent from consideration of the following detailed description.

Figure 1:
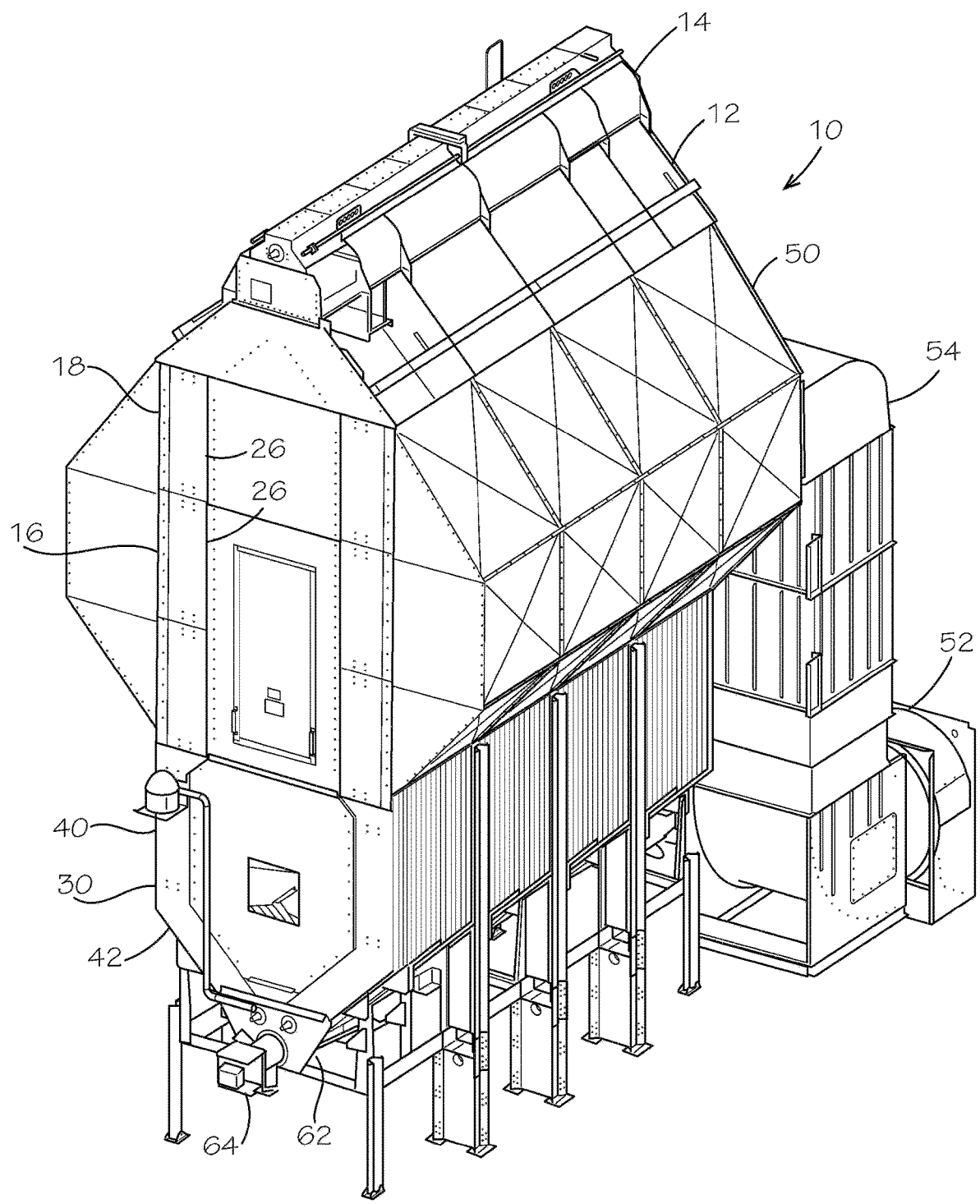
FIG. 1 is a perspective view of a mixed flow grain dryer according to an embodiment of the invention.
Figure 2:
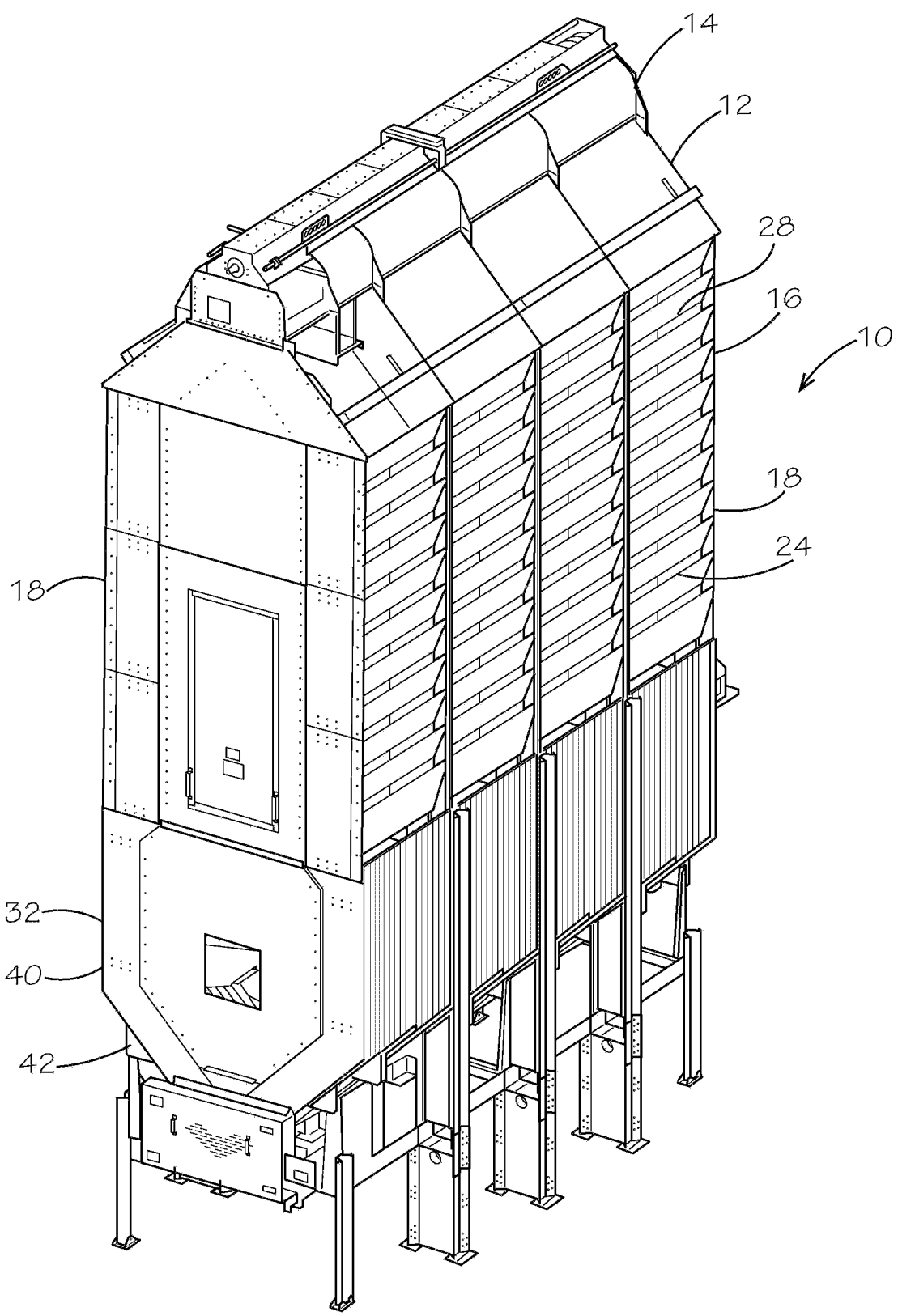
FIG. 2 is a perspective view of the mixed flow grain dryer with ducting removed for clarity.
Figure 3:
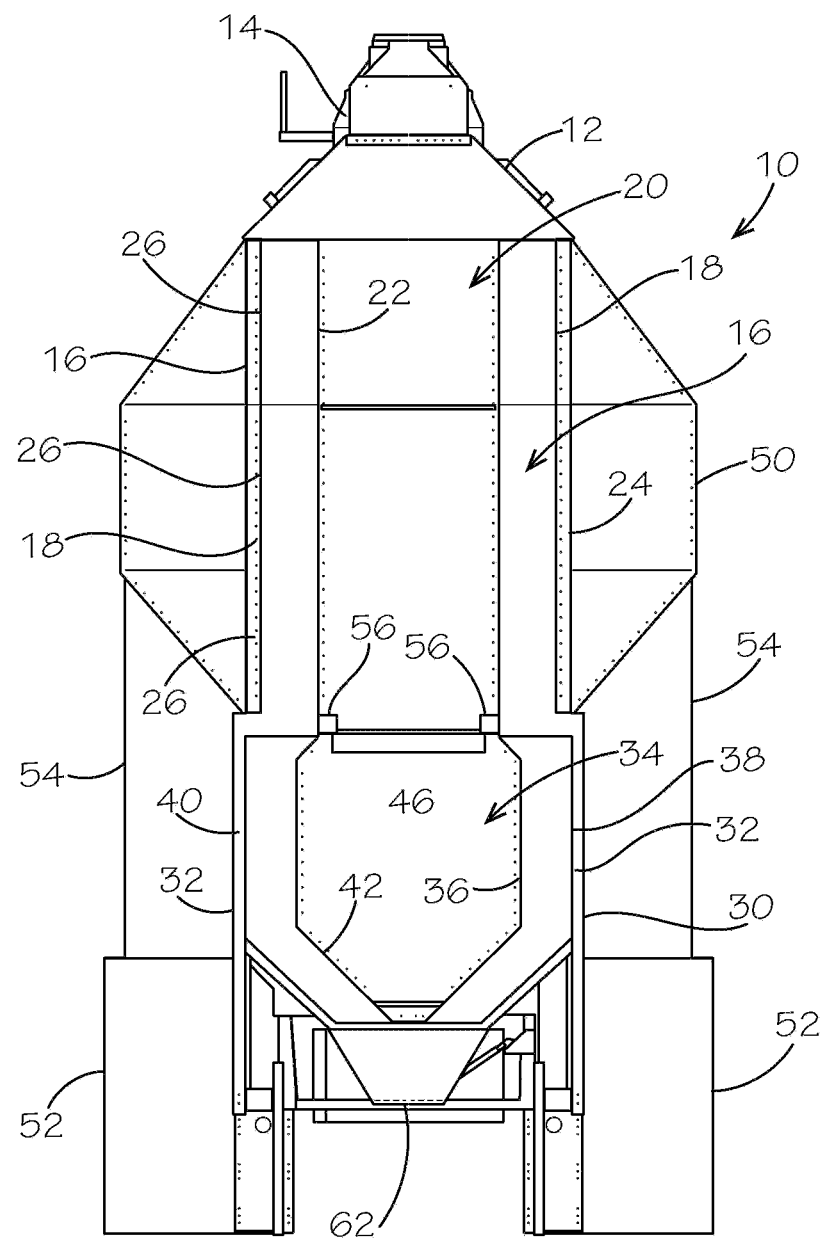
FIG. 3 is a schematic end view of the mixed flow grain dryer.

Referring now to FIGS. 1-3, an example grain dryer 10 has a wet hold section 12 that acts as a receiving area for grain entering the dryer 10 through an inlet port 14. The wet hold section 12 is in communication with and distributes grain to a heated drying section 16. Desirably, the heated drying section 16 is formed having a pair of separated heating columns 18. As perhaps best seen in FIG. 3, between the heating columns 18 is an upper plenum 20. Each heating column 18 has an inner wall 22 and an outer wall 24 configured to contain and direct the grain in a downward direction. In the illustrated embodiment, each heating column 18 is divided into three baffled section 26. In one embodiment, the heating columns 18 have a plurality of alternating rows of baffles 28 that provide air paths from the inner wall 22 to the outer wall 24 as will be described more fully below.

Beneath and in communication with each of the heating columns 18 of the heated drying section 16 is a cooling section 30 having a pair of cooling columns 32. Between the cooling columns 32 is a lower plenum 34. Each cooling column 32 comprises a screened inner wall 36 and a screened outer wall 38. Each cooling column 32 has a vertical upper portion 40 and a sloped lower portion 42. Desirably the upper portion 40 has a vertical height of between about 2 and about 5 feet, and more desirably about 4 feet. In one embodiment, the baffled heated drying section 16 of the dryer 10 represents about 70% of the grain holding capacity of the dryer 10, and the screened cooling section 30 represent about 30% of the grain holding capacity of the dryer 10.

A heater 46 is located between the lower plenum 34 and the upper plenum 20. Air in the lower plenum 34 is directed through the heater 46 and into the upper plenum 20 as will be described below.

In the illustrated embodiment, the three baffled levels 26 of the drying section 16 are encased in a single duct work 50. Air is drawn through the heating columns 18 and into the duct work 50 by at least one fan 52. In the illustrated embodiment, duct work 50 on each side of the dryer 10 leads to a pair of fans 52 positioned substantially at the ground level through fan inlet conduits 54, with one of the fans 52 positioned on each side of the dryer 10. Fans 52 creates a negative pressure within the duct work 50 compared to the outside air. Thus, the fans 52, via the duct work 50, draw a vacuum in the upper and lower plenums 20, 34. Desirably, the fans 52 are centrifugal fans, which are known in the art and need not be described in further detail herein. Some air entering the heated drying section 16 from the upper plenum 20 will bypassed the lower plenum 34 through adjustable louvers 56 at each end of the cooling section 30 of the dryer 10.

The outer and inner walls 36, 38 of the cooling section 30 are formed with perforated screens to minimize the introduction of particulate matter into the recovered air stream in the lower plenum 34. Use of perforated screens prevent issues arising from passing materials through the fan 52 and heater 46, and keep the upper and lower plenums 20, 34 clean and free from debris.

In operation, grain enters the dryer 10 through inlet port 14 and into the wet hold section 12. From the wet hold section 12, grain flows into heating columns 18 where it is exposed to heated air in the heating section 16. The grain flows down the heating columns 18 and is directed to columns 32 of the cooling section 30. From the cooling section 30, grain flows to an unloading section 62. In communication with the unloading section 62 is a conveying mechanism 64 such as an auger, drag conveyor, belt conveyor or the like.

Outside or ambient air flows through perforated outer wall 36 to the perforated inner wall 38 of cooling columns 32 and into the lower plenum 43 due to the negative pressure created by fans 52. As the ambient air flows through the grain within cooling columns 32, the air is heated while it cools the grain. The heated air received within the lower plenum 34 from cooling columns 32 is pulled into and further heated by heater 46, before entering the upper plenum 20. Because the air entering the upper plenum 20 from lower plenum 34 is already heated, less energy is needed to heat the air to appropriate drying temperature within the upper plenum 20. Since the baffled heated drying section 16 of the dryer 10 contains a greater percentage of the grain holding capacity of the dryer, roughly 70% of the air will be bypassed through the adjustable louvers 54 at each end of the cooling section 30 of the dryer 10.

The heated air then flows from the upper plenum 20 through the heating columns 18 to heat and dry the grain in the heating section 16. The air then flows from the heating columns 18 through the duct work 50 where it is drawn into the fans 52.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A grain dryer comprising:
   a receiving area having an inlet port to receive grain entering the dryer;
   a heated drying section comprising a pair of heating columns with an upper plenum in communication with the pair of heating columns, each heating column having an inner wall and an outer wall configured to contain and direct the grain in a downward direction around a plurality of baffles that provide air paths from the inner wall to the outer wall;
   a cooling section beneath and in communication with heated drying section, the cooling section comprising a pair of cooling columns with a lower plenum in communication with the pair of cooling columns, each cooling column having a screened outer wall and a screened inner wall;
   a heater between the lower plenum and the upper plenum, wherein air is heated by the heater as air in the lower plenum is pulled through the heater and into the upper plenum;
   a ductwork connected to the outer wall of each heating column;
   at least one fan that takes a suction from the ductwork to draw a vacuum in the upper plenum and the lower plenum compared to ambient pressure; and
   an unloading section comprising a grain conveying mechanism;
   wherein grain enters the dryer through inlet port and flows from the receiving area into the heating columns where the grain is exposed to heated air being pulled from the upper plenum into the ductwork, and wherein the grain flows from the heating columns into cooling columns where the grain is exposed to cooling air being pulled through the outer walls of the cooling columns into the lower plenum, and wherein the grain flows from the cooling section into the unloading section.

2. The dryer of claim 1 wherein each cooling column has a vertical upper portion and a sloped lower portion.

3. The dryer of claim 2 wherein the upper portion has a vertical height of between two and five feet.

4. The dryer of claim 1 wherein the baffled heated drying section of the dryer contains about 70% of a grain holding capacity of the dryer and the screened cooling section contains about 30% of the grain holding capacity of the dryer.

5. The dryer of claim 1 wherein the at least one fan is a centrifugal fan.

6. The dryer of claim 1 further comprising at least one adjustable louver, wherein at least some air that enters the upper plenum enters the upper plenum through the at least one adjustable louver and bypasses the cooling section.

\* \* \* \* \*